No. 889,506. PATENTED JUNE 2, 1908.
J. L. BRIM.
STACKER.
APPLICATION FILED AUG. 24, 1907.
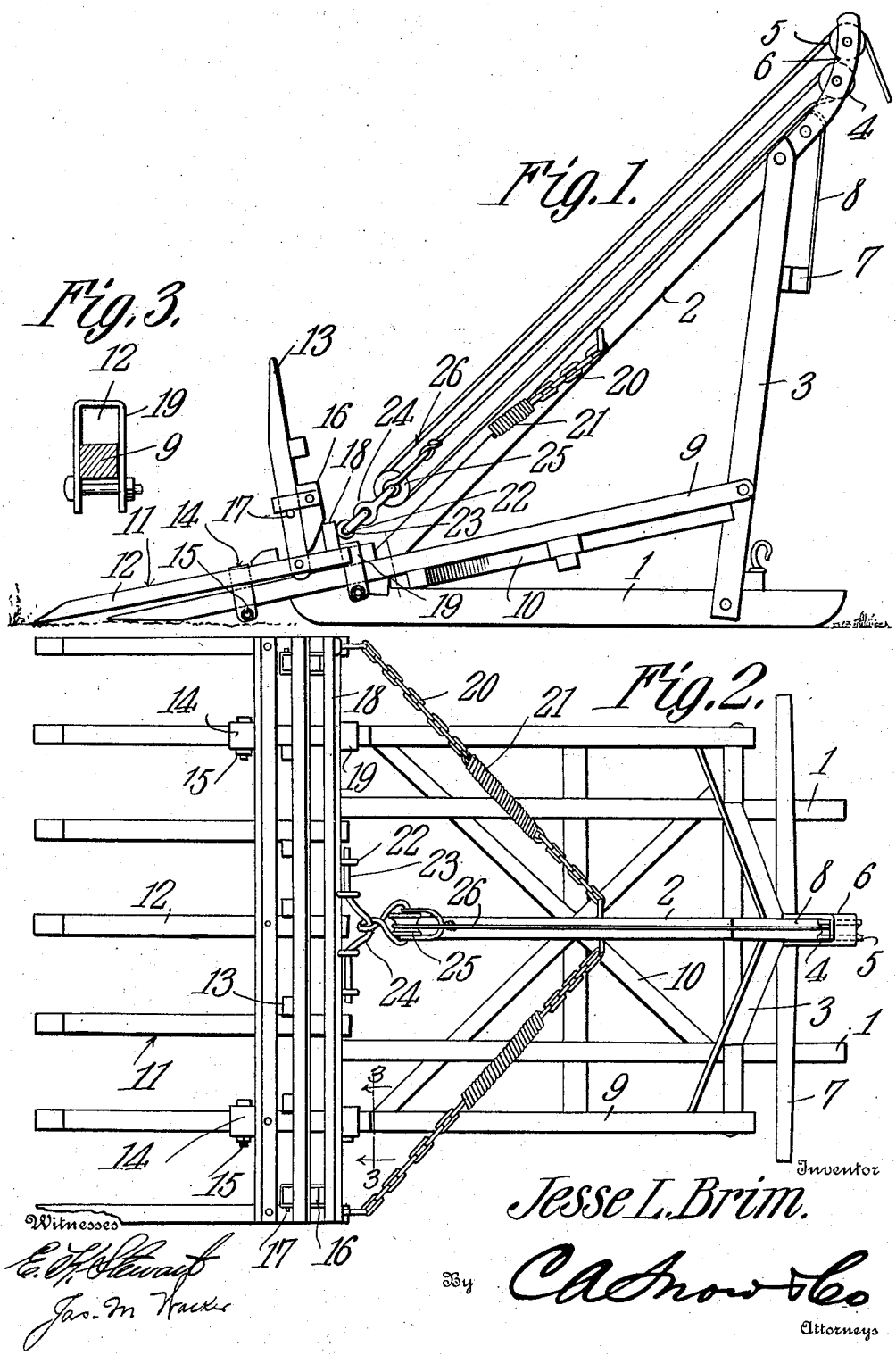
Witnesses
Inventor
Jesse L. Brim.
By C. A. Snow & Co.
Attorneys

UNITED STATES PATENT OFFICE.

JESSE L. BRIM, OF NEW VIRGINIA, IOWA.

STACKER.

No. 889,506. Specification of Letters Patent. Patented June 2, 1908.

Application filed August 24, 1907. Serial No. 390,067.

*To all whom it may concern:*

Be it known that I, JESSE L. BRIM, a citizen of the United States, residing at New Virginia, in the county of Clarke and State of Iowa, have invented a new and useful Stacker, of which the following is a specification.

This invention has relation to stackers and it consists in the novel construction and arrangement of its parts as hereinafter shown and described.

The object of the invention is to provide a stacker for hay, straw and the like, which may be easily and readily operated for elevating and depositing the material and which may be so adjusted as to elevate the material to a greater height as the stack progresses. Thus the stacker may be employed for depositing the hay upon a low or tall stack without unduly elevating the same.

The stacker is mounted upon runners which afford means for transporting the same over the surface of the ground. A derrick is mounted upon the runners and arms are pivotally connected to said derrick. A cradle is mounted upon the arms and is provided with a set of tines lying parallel with the arms and a set of tines pivotally connected to the first said set of tines. Means is provided for adjustably securing the cradle upon the arm. A tackle is arranged upon the derrick and is connected with said cradle, whereby the arms are swung as the cradle is raised and lowered. Chains having resilient links or members are connected at their inner ends to the derrick and at their outer ends to the said cradle and form means for yieldably supporting the said cradle in the vicinity of the ground.

In the accompanying drawing:—Figure 1 is a side elevation of the stacker. Fig. 2 is a top plan view of the same, and Fig. 3 is a detailed sectional view of a portion of the same cut on the line 3—3 of Fig. 2.

The stacker consists of the runners 1 upon which is mounted the derrick 2, the braces 3 being interposed between the upper portion of the derrick 2 and the runners 1. The pulleys 4 and 5 are journaled at the upper end of the derrick 2 in suitable bearing plates 6 or their equivalents. The cross piece 7 is attached to the braces 3 with its end portions projecting for some distance beyond the outer side of the said braces. The strip 8 is attached at its lower end to the cross piece 7 and passes over the upper end of the derrick 2 to which it is attached. The arms 9 are pivoted at their ends to the braces 3 or blocks mounted thereon. Said arms are held together and in parallel relation by the cross pieces 10. The cradle 11 is mounted upon the free end of the arms 9. The said cradle consists of the tines 12 which lie in a plane parallel with the arms 9 and the tines 13 which are pivoted to the tines 12. The collars 14 surround two of the tines 12 and the arms 9 and are provided at their ends with the clamping bolts 15. The stops 16 are adjustably mounted upon the end tines 13 and are adapted to be moved longitudinally thereof and secured in an adjusted position by the cross pins 17. The stops 16 are provided with the beveled surfaces 18 which are adapted to engage the cross piece 19 supported at the rear ends of the tines 12. By adjusting the stops 16 the swing of the tines 13 with relation to the tines 12 may be regulated. The chains 20 are provided with resilient sections 21 and said chains are attached at their inner ends to the derrick 2 at an elevated point thereof and at their outer ends the said chains are adjustably connected with the end portion of the cross bar 19 or other parts of the cradle. The bar 22 is journaled in bearings 23 provided upon the bar 19. The bar 22 is provided at its middle with a crank or bend 24. The said bend 24 is engaged by the hook of a block 25. One end of the tackle 26 is attached to the bail of the block 25, the said tackle then passes over and around the pulley 4, then descends and passes under and around the pulley of the block 25, then passes up and around the pulley 5 and descends to the ground.

From the foregoing description it is obvious that when the arms 9 are swung down and the cradle is lowered to the vicinity of the surface of the ground the said cradle may be loaded with hay or straw and when filled the tackle 26 is drawn, which will draw the free ends of the arms 9 toward the pulleys 4 and 5. At the same time the cradle, carrying the hay, is elevated. When the arms 9 assume a vertical position or substantially so, the tines 13 swing on their pivots and as the hay is thus relieved of support it falls over the end of the derrick 2 upon the stack. As the stack advances or increases in height the bolts 15 are loosened and the collars 14, together with the cradle, are slipped longitudinally along the arms 9 in order that the said cradle may elevate the hay higher in order to deposit the same upon the top of the stack during its formation. The ends of the cross bar 7 project across the path of the arms 9, consequently, the said arms cannot swing beyond the said cross bar. Before loading the cradle the same is elevated slightly above the surface of the ground and is held in such position by the chains 20 as the cradle is loaded the tension of the springs 21 is increased, consequently when the cradle is loaded the said springs are under high tension which will assist in the operation of swinging the arms and elevating the cradle.

Having described my invention what I claim as new and desire to secure by Letters-Patent is:—

In a stacker, a derrick, arms pivotally mounted upon the stacker, a cradle mounted upon said arms and having two sets of tines one of which is pivoted to the other, sliding blocks mounted upon the pivoted tines and adapted to engage relatively fixed parts of the cradle and a tackle operating over the derrick for elevating the cradle.

In testimony that I claim the foregoing as my own, I have hereto affixed my signature in the presence of two witnesses.

JESSE L. BRIM.

Witnesses:
J. H. KEERAN,
A. F. WADE.